(12) United States Patent
Taylor

(10) Patent No.: US 7,117,999 B2
(45) Date of Patent: Oct. 10, 2006

(54) WHEEL RIM STACKING DEVICE

(75) Inventor: Stephen Thomas Taylor, Auckland (NZ)

(73) Assignee: Functional Packaging Limited, Auckland (NZ)

( * ) Notice: Subject to any disclaimer, the term of this patent is extended or adjusted under 35 U.S.C. 154(b) by 0 days.

(21) Appl. No.: 10/426,972

(22) Filed: May 1, 2003

(65) Prior Publication Data

US 2004/0217074 A1   Nov. 4, 2004

(51) Int. Cl.
*A47F 7/00* (2006.01)
(52) U.S. Cl. .................................... 211/59.4
(58) Field of Classification Search .............. 211/23, 211/59.4, 194
See application file for complete search history.

(56) References Cited

U.S. PATENT DOCUMENTS

| | | | | |
|---|---|---|---|---|
| 5,080,314 A | * | 1/1992 | Moyer et al. | 248/346.4 |
| 5,123,547 A | * | 6/1992 | Koch | 211/59.4 |
| 5,735,412 A | * | 4/1998 | Sheckells | 211/59.4 |
| 6,360,903 B1 | * | 3/2002 | Flores | 211/85.22 |
| 6,637,607 B1 | * | 10/2003 | Tombu | 211/85.22 |

FOREIGN PATENT DOCUMENTS

| | | |
|---|---|---|
| GB | 2 277 506 A | 11/1994 |
| WO | WO94/04429 | 3/1994 |

* cited by examiner

*Primary Examiner*—Sarah Purol
(74) *Attorney, Agent, or Firm*—Jacobson Holman PLLC

(57) ABSTRACT

A wheel rim stacking apparatus to stack at least two wheel rims in a co axial and vertical relationship. The apparatus including an annular flange including an inwardly directed substantially cylindrical shaped wall of a diameter substantially commensurate with the outside diameter of the bead of a wheel rim to allow the wheel rim to be located with the cylindrical wall to be located on the outside thereof, the cylindrical wall having an upper edge and a lower edge. The annular flange including therefrom a radially inwardly extending landing web positioned intermediate of the upper and lower edge of the cylindrical wall, the landing web presenting (a) an upwardly facing surface by which a lower positioned bead of the wheel rim can engage to provide a vertical support to an upper one of the wheel rims and (b) a lower surface to locate on top of the upper positioned bead of an adjacent lower one of the wheel rims.

13 Claims, 12 Drawing Sheets

WHEEL RIM STACKING DEVICE

TECHNICAL FIELD

This invention relates to an improved stacking apparatus and method.

More particularly the present invention relates to improvements in apparatus and methods for stacking a plurality of vehicle wheel rims, for storage and/or transportation purposes.

BACKGROUND ART

Once manufactured, a wheel rim, needs to be transported to the particular sales destinations.

Present methods for transporting wheel rims in large quantities involve stacking the rims on top of each other in columns on pallets.

To ensure that movement and friction between adjacent rims does not cause wheel damage, (which may detract from the aesthetic or functional qualities of the wheel rims), a formed corrugated cardboard tray is typically placed on a wooden pallet. Mag wheels are then placed inside the tray. Corrugated cardboard dividers are then placed between the wheels. Another corrugated cardboard tray is then placed upon top of a singe layer of wheels and the process is repeated until the desired palletised height has been reached. Another corrugated cardboard tray is placed on top of the last layer and the palletised load is strapped down using appropriate strapping such as plastic webbing.

However, inevitably, whether by movement in transporting the pallets to the shipping containers, or movement within the shipping containers themselves, the columns move relative to each other and make the load unstable.

Further, the cardboard compresses, causing the strapping, to slacken, and the stack to become unstable.

It is an object of the present invention to address the foregoing problems or at least to provide the public with a useful choice.

BRIEF DESCRIPTION OF INVENTION

In a first aspect the present invention consists in a wheel rim stacking apparatus to stack at least two wheel rims in a co axial and vertical relationship, said apparatus including:

an annular flange including an inwardly directed substantially cylindrical shaped wall of a diameter substantially commensurate with the outside diameter of the bead of a said wheel rim to allow a said wheel rim to be located with said cylindrical wall to be located on the outside thereof, said cylindrical wall having an upper edge and a lower edge, said annular flange including therefrom a radially inwardly extending landing web positioned intermediate of said upper and lower edge of said cylindrical wall, said landing web presenting (a) an upwardly facing surface by which a lower positioned rim flange of a said wheel rim can engage to provide a vertical support to an upper more of said wheel rims and (b) lower surface to locate on top of the upper positioned rim flange of an adjacent lower of said wheel rims said annular flange having disposed at its periphery at least one means to lock said apparatus with a like means to lock of a like stacking apparatus positioned co planar and adjacent thereto in order to allow two or more adjacent stacks of apparatus supported wheel rims to depend on each other.

Preferably said means to lock are provided, positioned at the periphery of said annular flange in diametrically opposed locations.

Preferably four pairs of said means to lock are provided, each pair positioned equispaced at the periphery of said annular flange.

Preferably said means to lock permits releasable lockability to a like means to lock of a like and adjacent apparatus.

Preferably said means to lock is a catch and is integrally formed with the annular member.

Preferably said landing web includes on its upwardly directed surface an upstand located radially inward of said annular flange and projecting in said upwardly direction preferably no higher that said upper edge.

Preferably said upstand is an endless annular rib concentric with said annular flange.

Preferably a plurality of discrete upstands are positioned along a line concentric with said annular flange.

Preferably each said means to lock includes a slot extending in the upward/downward direction into which a leg of a bifurcated locking element can locate, the other leg of said bifurcated locking element likewise engagable with a an adjacent apparatus such that the locking element can selectively engage adjacent apparatus together.

Preferably two pairs of said means to lock are provided for the engagement to a like and adjacent apparatus.

Preferably said array includes at least two rows and two columns (when viewed in plan) of apparatus.

In a second aspect the present invention consists in a stack of wheel rims comprising at least one lower most wheel rim positioned with its axis extending vertically and at least one other wheel rim located adjacent and above said lower most wheel rim and with its axis coaxial with the axis of said lower most wheel rim, wherein an apparatus is interposed between said adjacent wheel rims of said stack.

Preferably each stack is interconnected with an adjacent stack by the coupling together of the co planar located apparatus of adjacent an stacks. Preferably capping means are provided at each end of said stack, said capping means capable of locating strapping to extend about said stack (end to end) to hold said wheel rims in the axial direction together.

Preferably said capping members are located over the upper and lower most beads of said upper and lower most wheel rims respectively.

In a further aspect the present invention consists in a method for securing at least two adjacent wheel rims in a stack formation, characterised by the steps of (in no particular order):

(i) placing onto a first wheel rim, a wheel rim stacking apparatus of a kind which includes at least one annular flange having an inwardly facing cylindrical surface of a diameter commensurate with the external diameter of a bead of said lower most wheel and including a landing web extending radially inwardly from said annular flange, such that a lower directed surface of said web engaging at said bead with said lower most wheel, said stacking apparatus also presenting an upwardly facing surface of said landing web (ii) placing onto said upwardly facing surface of said landing flange a second wheel rim, said second wheel rim captured by an annular flange in a manner coaxial with said first wheel rim (iii) repeating the process with a subsequent wheel rim to generate a stack of wheel rims wherein the stacking apparatus of a first of said stacks are engaged with like stacking apparatus of an adjacent stack by means of a locking mechanism.

Preferably a stack of wheel rims consisting of at least two wheel rims positioned coaxially with each other wherein their axes extend substantially vertically, and wherein an apparatus is interposed between adjacent wheel rims of said stack.

Preferably adjacent stacks are engaged to each other via the interconnection of at least some of the rim stacking apparatus provided coplanar to each other within each stack.

Preferably a container which has located therein a plurality of stacks of wheel rims wherein each stack consists of at least two wheel rims wherein interposed between each adjacent wheel rim of each stack there is an apparatus.

Preferably each stack of wheel rims is engaged with a stack adjacent thereto by means to lock disposed at the perimeter at each stacking apparatus.

Preferably the catch mechanism may be an arrangement that permits releasable lockability to a like catch or to a like disk.

Preferably the catch may be integrally formed with the disk, or may be component attached to the disk.

In some embodiments, the catch may include a recess formed in the side of the disk wall, and a joining element is configured to fit and join the recesses of adjacent apparatus.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth. For the purposes of illustrating the invention, there is shown in the drawings a form which is presently preferred. It is being understood however that this invention is not limited to the precise arrangements shown.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
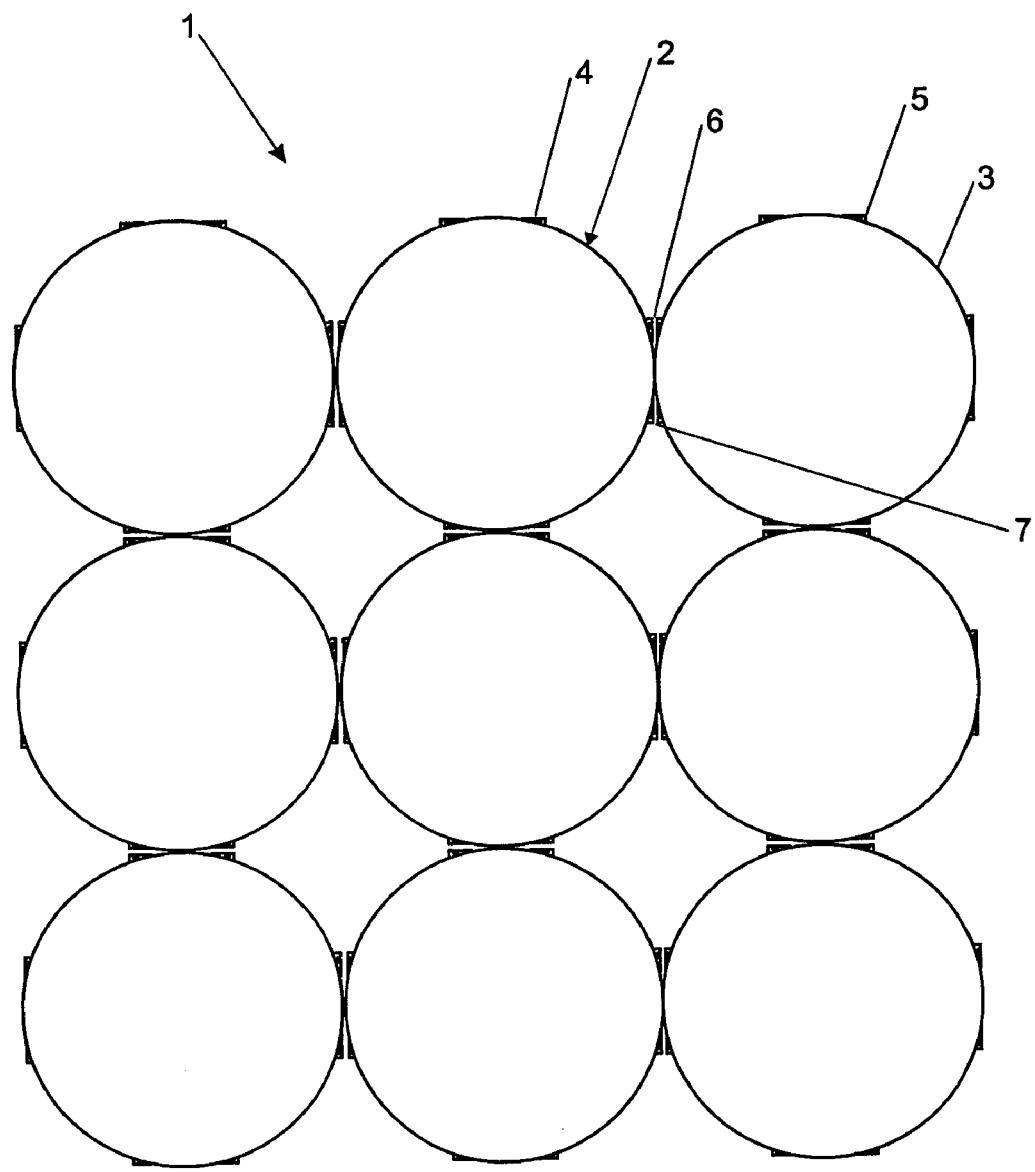
FIG. 1 shows a plan view of the layout according to the present invention.

FIG. 1 shows a plan view of a number of stacks of wheel rims using the apparatus according to the present invention shown by general arrow 1.

Figure 2:
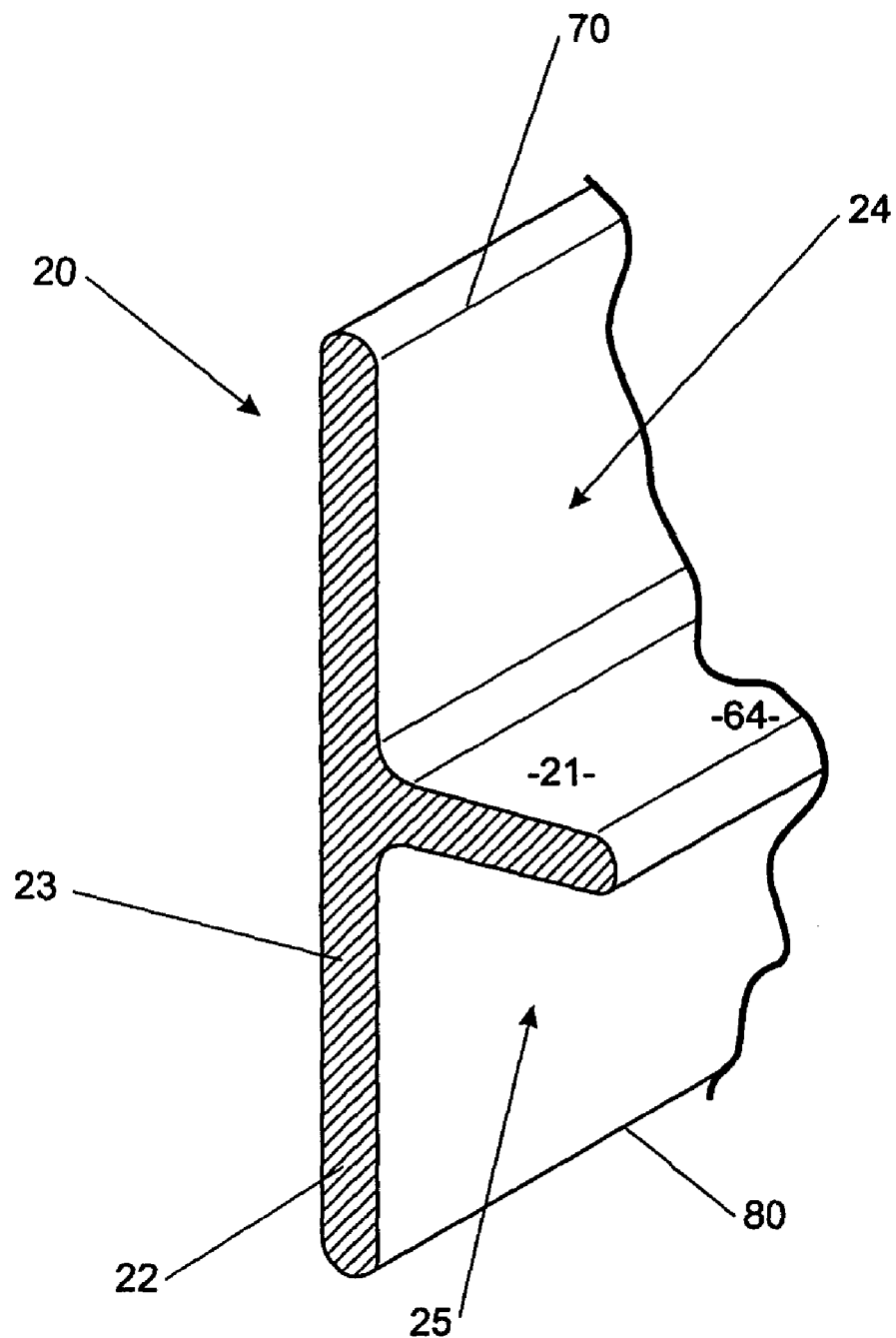
FIG. 2 shows a cross sectional view of an embodiment of the present invention.
Figure 2A:
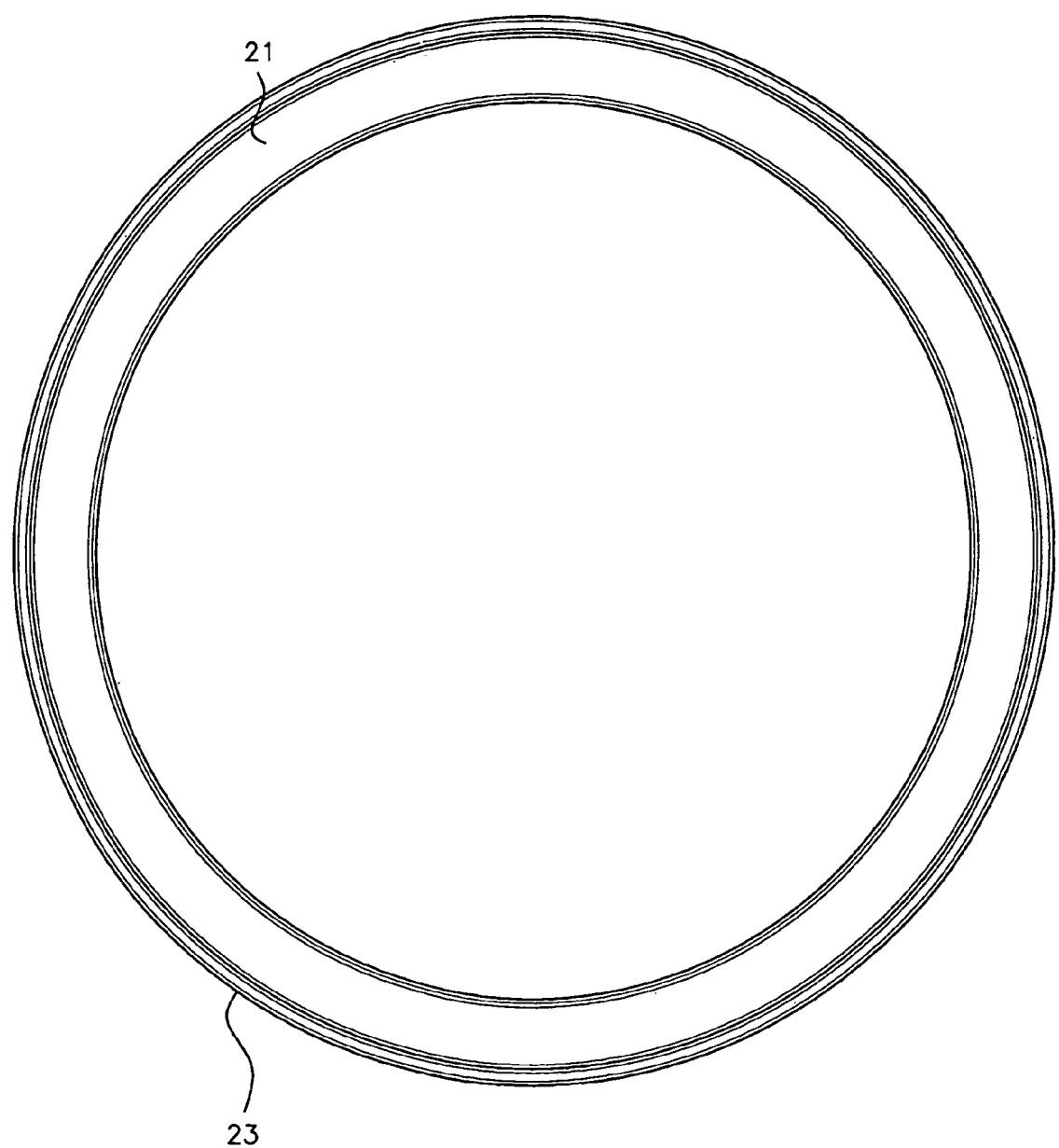
FIG. 2A is an enlarged plan view of the annular flange and radially inwardly projecting landing web of the present invention.
Figure 5:
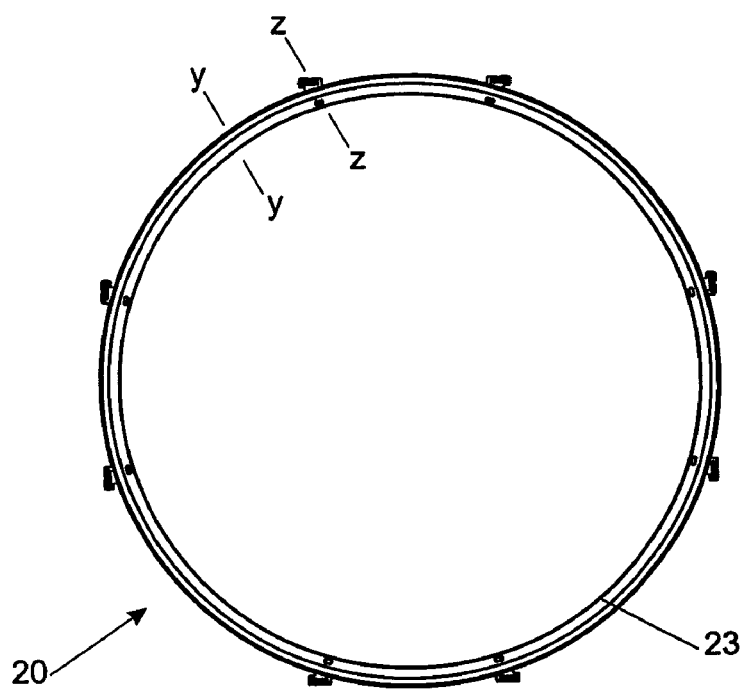
FIG. 5 is a plan view of a connecting disk of the present invention.
Figure 6:
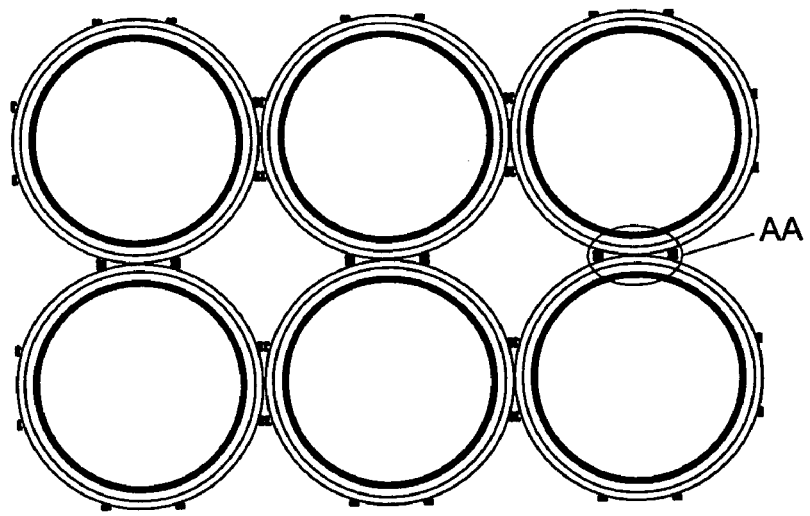
FIG. 6 is a plan view of a plurality of connecting disks engaged to each other to define a six array member to interpose between 12 rims.

With reference to FIGS. 2 and 5, there is shown a cross section of the connecting disk according to the present invention shown by general arrow 20. The disk 20 comprises a central substantially annular ring or flange 23. In some embodiments the disk may be a whole disk portion.

Figure 14:
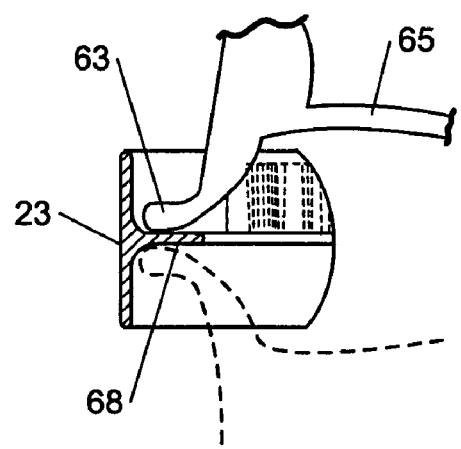
FIG. 14 is a sectional view through section YY of FIG. 5.

Depending perpendicularly from the annular flange 23 is a landing web. The landing web is dependent from the annular flange 23 to extend radially inwardly therefrom. The annular flange 23 includes an interior cylindrical surface 24 which is substantially of the same diameter as the exterior diameter of a wheel rim at its rim flange. With reference to FIG. 14, part of a wheel rim is shown engaged with the apparatus of the present invention wherein the wheel rim flange 63 is located on top of the upwardly directed surface 64 of the landing web 21 and against the inwardly facing cylindrical surface 24 of the annular flange 23. The wheel rim 65 thereby has extended about the flange 63 the apparatus of the present invention. The wheel is thereby captured in a direction lateral to the axial direction of the wheel within the apparatus of the present invention. Likewise the lower directed surface 68 of the radially extending web 21 can engage onto the upper rim flange region of a lower wheel rim shown in phantom The cylindrical surface 25 of the annular flange 23 is preferably of the same diameter as the diameter of the upper flange of the lower wheel rim to thereby allow it to be captured snugly within the perimeter of the cylindrical surface 25 of the flange 23.

Figure 3:
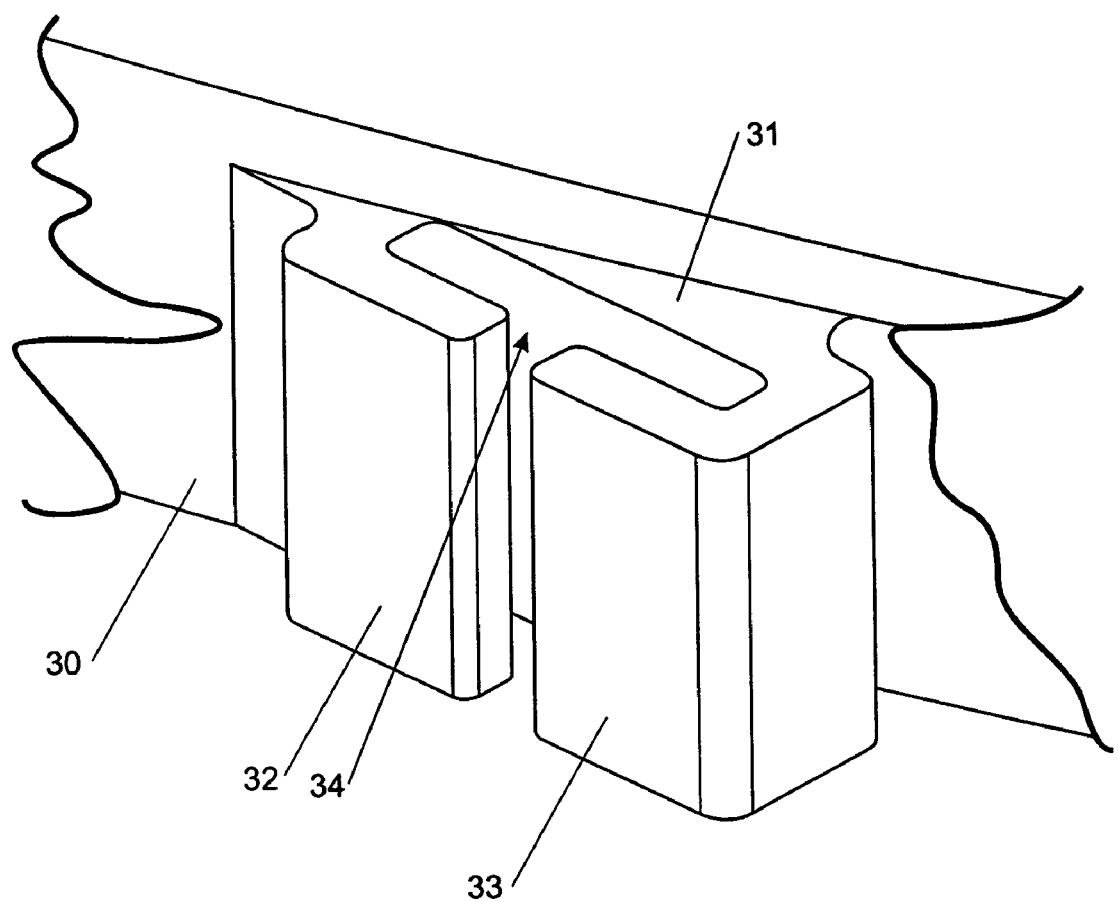
FIG. 3 shows a preferred embodiment of a catch mechanism.

FIG. 3 shows the exterior periphery of a joining disk 30 according to the present invention.

The apparatus for locking wheels of a stack or connecting disks 2 and 3 (shown in a 3×3 configuration) include fastening means or catches 4 and 5.

The number of wheel rims stacked in the column, and the number of columns will depend on the transport and container requirements.

The present invention will allow a plurality of columns to be connected together at many points along the height of the column to an adjacent column, providing a stable matrix.

The susceptibility to sway movement is thereby greatly reduced.

It is envisaged that the present invention may be used in conjunction with traditional methods including strapping and palletising.

Adjacent catch pairs 6 and 7 are joined via a joining element 60. A matrix of the joining configuration shown in the FIG. 1 provides for laterally and vertically stable stacks of wheel rims.

The joining elements 60 as for example shown in FIGS. 8–11 includes to bifurcated leg sections 61 which can slot into a groove 34 of the locking means of the connecting disks.

On the exterior of the flange 23 there is a catch or fastening means 31. The catch 31 includes two oppositely facing portions 32 and 33 which collectively form a "T" section 34. It can be seen that portion 33 is distanced further from the outside of the disk 30 than portion 32. This is so that when adjacent disks in the same place of an adjacent stack are placed against each other, both of the catches 31 that are preferably positioned in pairs equally distanced apart on four regions on the exterior of the disk, will be substantially aligned near one another for easy joining using the joining element shown in FIG. 4.

The number of catches provided, and their relative position on the disk will be chosen according to the stacking requirements.

For example, if four columns of rims are stacked to form a substantially square configuration the catches may be located at positions where the tangents of those positions on the periphery are substantially perpendicular.

However other catches such as clips, bolts and so forth may be used.

Reference to a disk may be made with reference to either a flat circular section, with perpendicularly depending annular flanges, or situations where the interior of the flat circular section has been removed so that the flat part of the disk upon which the wheel rim resides is in fact an annular ring, with the perpendicularly depending annular flanges.

It is envisaged that the above method will be incorporated with the apparatus and method previously defined herein.

The present invention allows each wheel to wheel movement to be reduced during the shipping procedure. Thus, the pallet stack remains stable and secure. This has obvious safety advantages, but also reduces the amount of the labour required at either end of the shipping process. This has a corresponding beneficial commercial effect.

A precise loading pattern can be formed and therefore pallet and container loading can be optimised.

By joining each layer together a very stable load for transporting the wheels is the result. Further, by containing a single wheel rim in a protected area reduces the risk of en route damage to the wheel rims.

Figure 4:
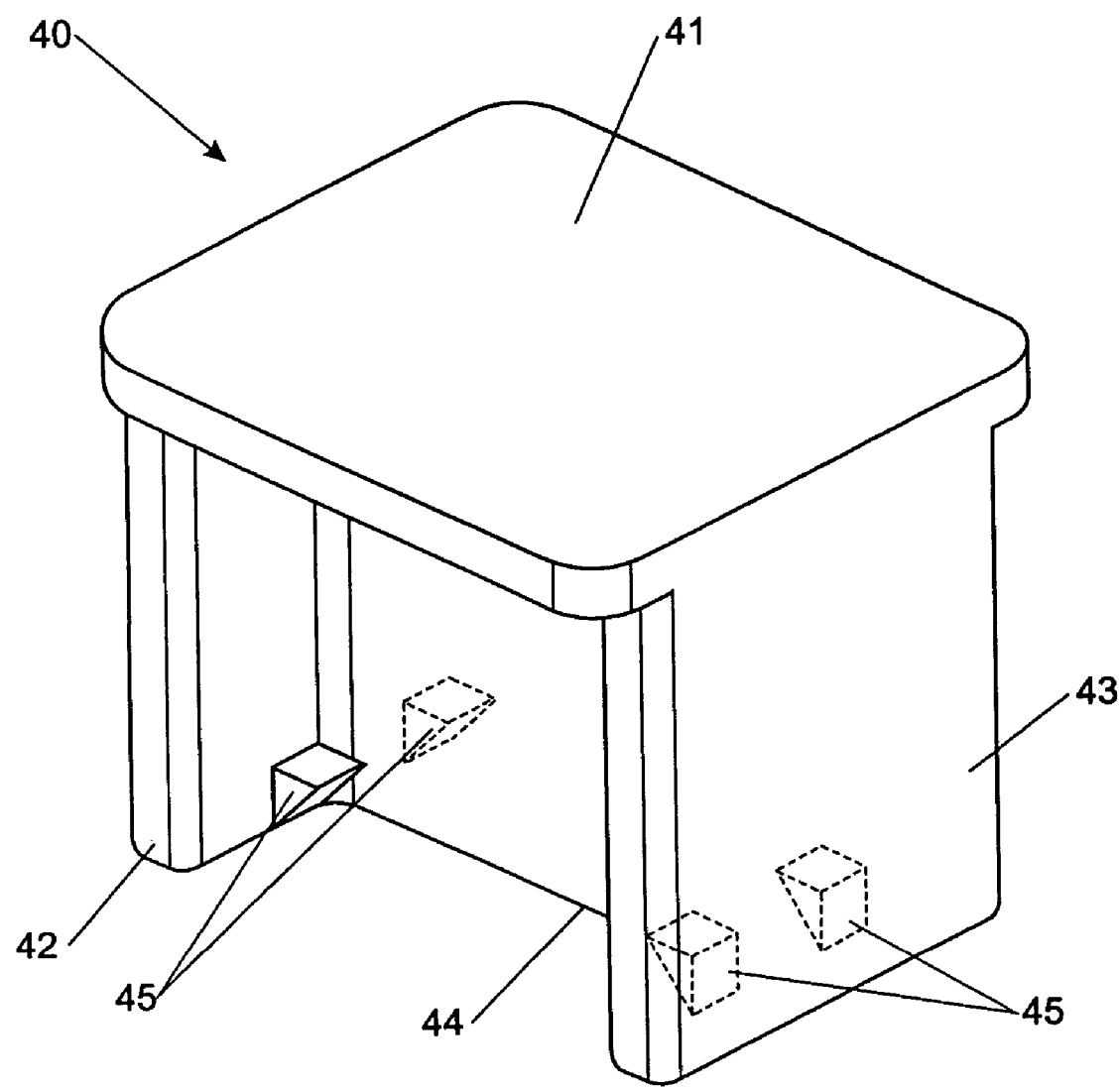
FIG. 4 shows a joining element to fit in with the catch mechanism shown in FIG. 3.

FIG. 4 shows a joining element 40 that is adapted to be slotted into the T section 34 of FIG. 3. The joining element 40 has a top section 41, with bifurcated end side sections 42 and 43. There is a centrally located wall 44. Together, the centrally located wall 44 and the ends 42 and 43 form a "T" shape, that is configured a slot inside the T space 34 shown in FIG. 3. There is also provided lugs 45 that may be used to secure the joining element in place by providing a snap lock fit.

Figure 7A:
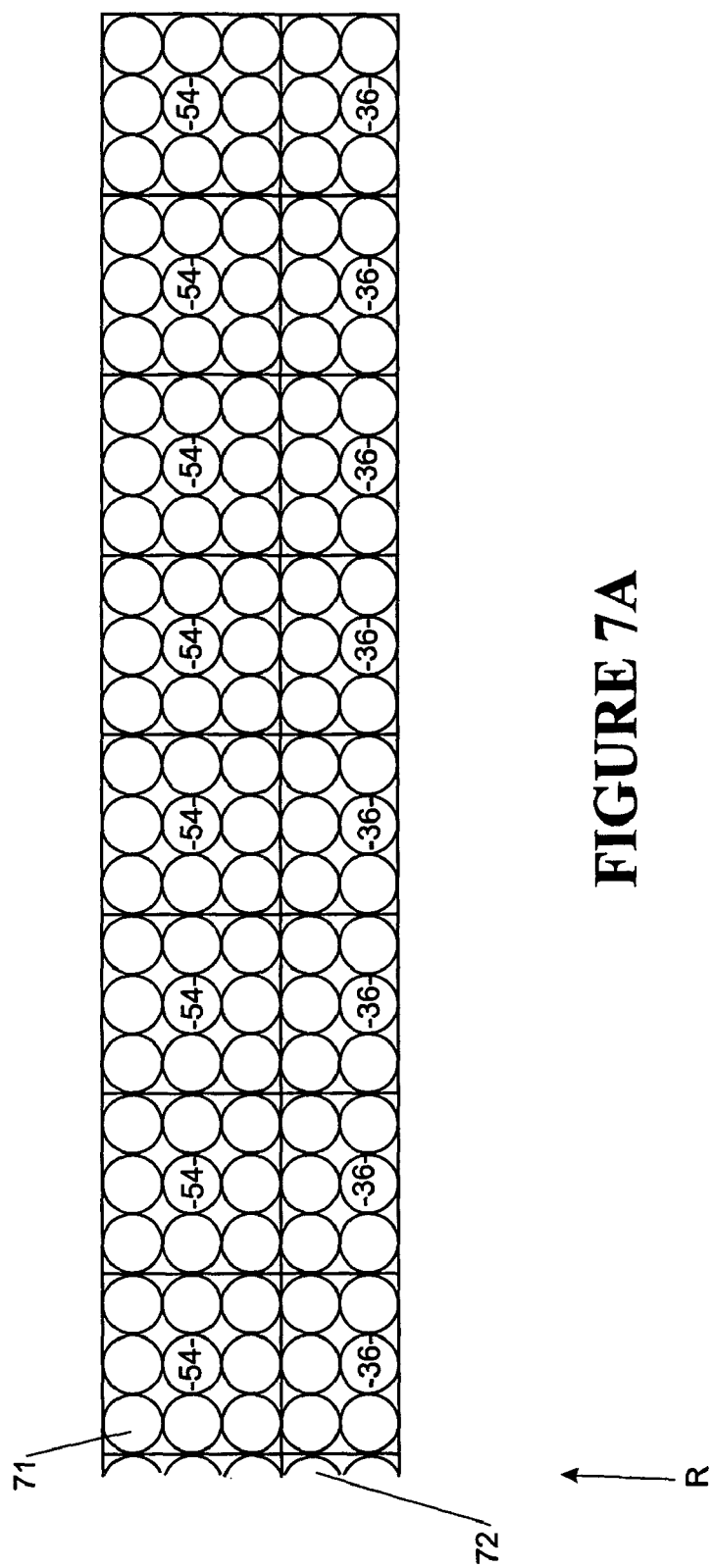
FIGS. 7A & 7B show a traditional container layout method.
Figure 7B:
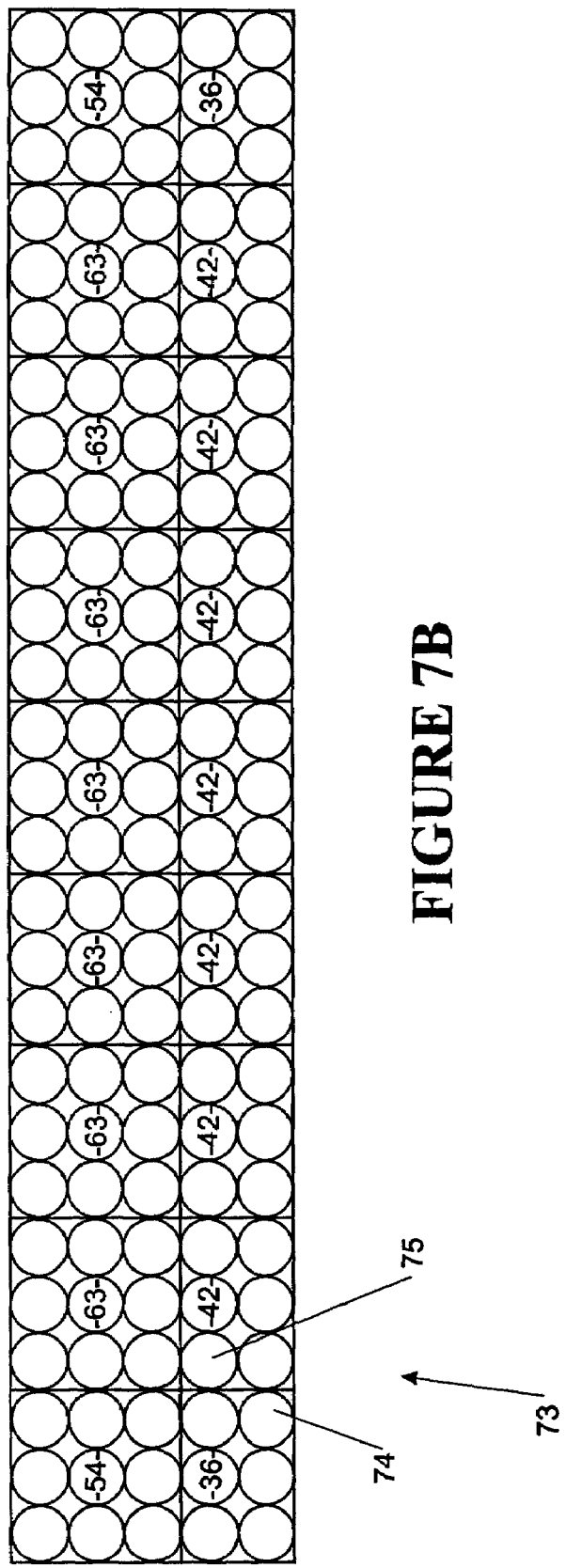
Figure 8:
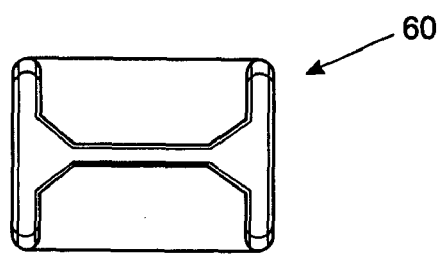
FIG. 8 is a front view of an alternative form of a joining element.
Figure 9:
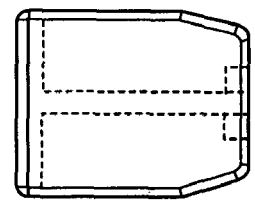
FIG. 9 is a side view of FIG. 8.
Figure 10:
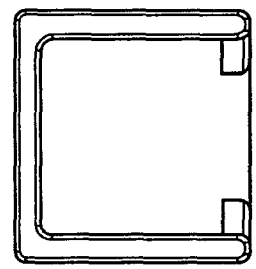
FIG. 10 is a plan view of FIG. 8.
Figure 11:
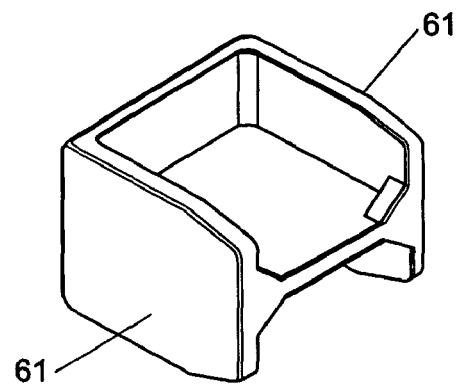
FIG. 11 is a perspective view of FIG. 8.
Figure 12:
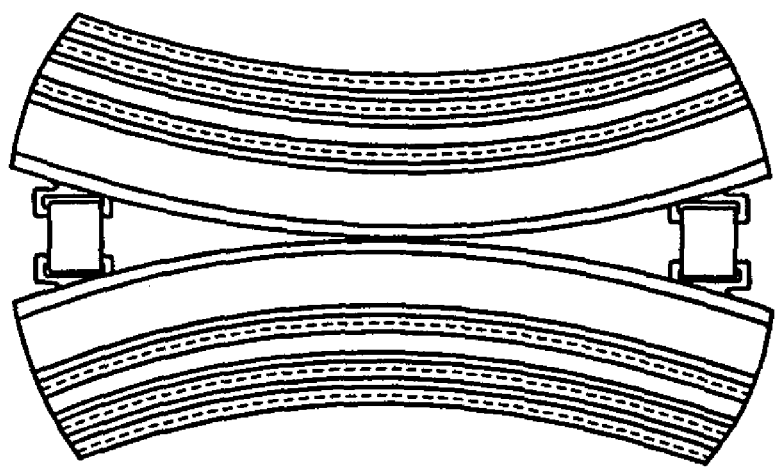
FIG. 12 is a close up view of part of two connecting disks and showing the use of the joining elements to join the two disks together.
Figure 13:
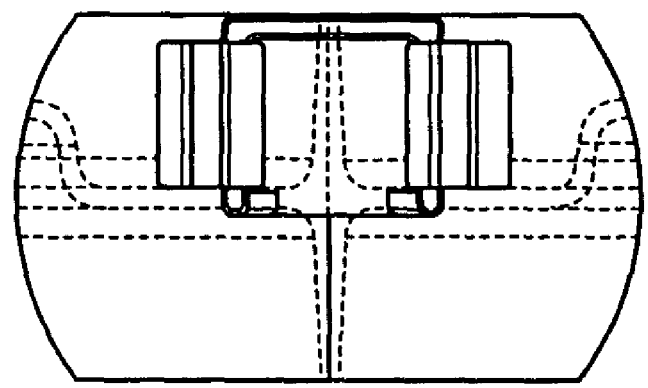
FIG. 13 is a sectional view through section XX of FIG. 12.

FIG. 7A shows a top layer of an existing container layout whereas FIG. 7B shows the bottom layer of an existing container layout. The plan view shows 36 pallets per container with the pallets stacked two high in the container. Each section consists of a nine wheel per layer stack and a six wheel per layer stack. The six wheel per layer stack is typically around 336 mm by 804 mm in area, with the nine wheel per layer stack being approximately 1326 mm by 1326 mm.

Thus the top layer is capable of 810 wheel rims, whereas the bottom layer 915, making a total of 1725 rims.

The container stack 70 comprises rows of adjacently aligned wheel rims 71 and 71.

Aspects of the present invention have been described by way of example only and it should be appreciated that modifications and additions may be made thereto without departing from the scope thereof.

Whilst it is envisaged that the present invention will allow for wheels of a same diameter to be stacked on top of each other, it may be that in a stack a plurality of different diameter wheel rims are provided. It is a possibility for the cylindrical surface of the annular flange 23 to be presented at different diameters. For example the cylindrical surface 24 above the upwardly directed surface 64 of the web 21 may be of a greater or smaller diameter than the diameter of the cylindrical surface 25 below the web.

The web 21 is preferably located between the upper edge 70 and the lower edge 80 of the cylindrical surface 24, 25 of the annular flange 23. However where a capping means is to be provided to the stack either at the top or bottom of the stack, a capping member similar to the locking apparatus of the present invention may be provided but wherein the web 21 is positioned proximate more or at the upper or lower edges 70, 80. Furthermore for the capping member, a fill region is preferably provided inwardly of the annular flange 23 which provides protection to the exposed upper or lower surfaces of the end wheel rims of the stack.

Figure 15:
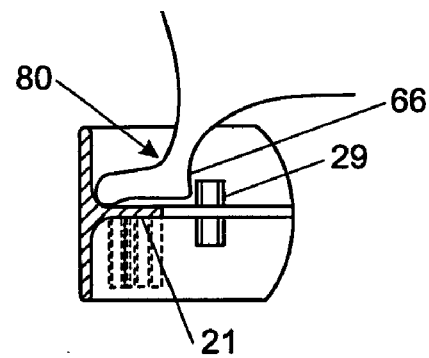
FIG. 15 is a sectional view through section ZZ of FIG. 5.
Figure 16:
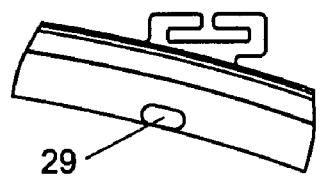
FIG. 16 is a close up plan view showing the catch region of the connecting disk.
Figure 17:
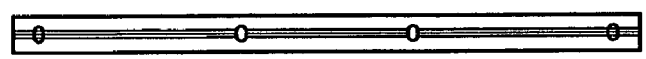
FIG. 17 is a side view of a connecting disk of the present invention.
Figure 18:
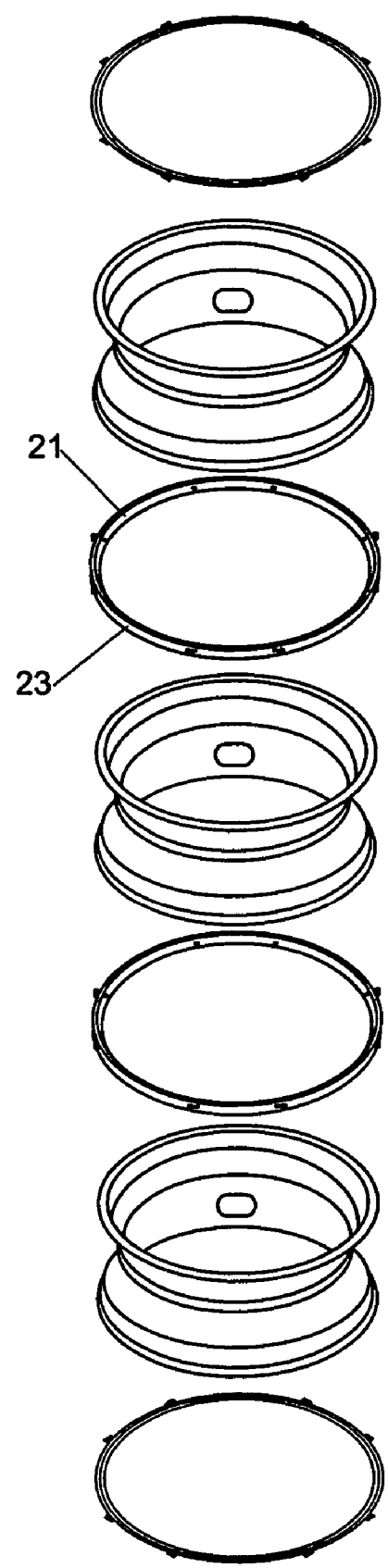
FIG. 18 is an exploded view of a stack of rims.

With reference to FIG. 15, a wheel rim of a kind which may have a bead with an external and internal diameter, a further upstand may be provided from the radial web 21. Such an upstand 29 is preferably provided from one of the upwardly, or downwardly directed surfaces 64, 68 of the radial web 21 and preferably on both sides The upstands 29 are radially more inwardly than the cylindrical surfaces of the annular flange and can be located against an inward radius 66 of the bead region 80 of a wheel rim. This may provide additional stability to the arrangement. The upstand 29 may come in the form of a series of upstands placed along a concentric line concentric to the substantially circular (in plain shape) annular flange 23 or may be a continuous concentric upstand.

I claim:

1. A wheel rim stacking apparatus to stack at least two wheel rims in a co axial and vertical relationship, said apparatus comprising:

an annular flange including an inwardly directed substantially cylindrical shaped wall of a diameter substantially commensurate with an outside diameter of a rim flange of said wheel rim to allow said wheel rim to engage said cylindrical wall, said cylindrical wall being located outside of said rim flange, and said cylindrical wall including an upper edge and a lower edge, a landing web extending radially inwardly from said annular flange and said landing web being positioned intermediate of said upper and lower edge of said cylindrical wall, said landing web presenting (a) an upwardly facing surface providing vertical support to an upper one of said wheel rims, and (b) a downwardly facing surface to locate on top of an adjacent lower one of said wheel rims, said annular flange having disposed at a periphery at least one connector to allow connection between a plurality of said annular flanges, to be positioned adjacent to each other, in order to allow two or more adjacent stacks of supported wheel rims to depend from each other, said connector facilitating mechanical and releaseable lockability with adjacent annular flanges.

2. The apparatus as claimed in claim 1, wherein two said connectors are provided, positioned at the outer periphery of said annular flange and in diametrically opposed locations.

3. The apparatus as claimed in claim 1, wherein four pairs of connectors are provided, each pair positioned equispaced at the periphery of said annular flange.

4. The apparatus as claimed in claim 1, wherein said connector is a catch and is integrally formed with the annular flange.

5. The apparatus as claimed in claim 1, wherein said landing web includes on its upwardly facing surface an upstand located radially inward of said annular flange and projecting upwardly.

6. The apparatus as claimed in claim 5, wherein said upstand is an endless annular rib concentric with said annular flange.

7. The apparatus as claimed in claim 5, wherein a plurality of said upstands are positioned along a circle line concentric with said annular flange.

8. A stack of wheel rims comprising at least one lower most wheel rim positioned with its axis vertically and at least one other wheel rim located adjacent and above said lower most wheel rim and with its axis coaxial with said lower most wheel rim, wherein an apparatus as claimed in claim 1 is interposed between said adjacent wheel rims of said stack.

9. The plurality of stacks of claim 8, wherein said stacks are interconnected with each other by said connectors.

10. The stack as claimed in claim 8, wherein a capping is provided at each end of said stack, said capping capable of locating strapping to extend about said stack to hold said wheel rims in the axial direction together.

11. A method for creating a stack of coaxially placed wheel rims, said method comprising the steps of:
 (i) placing onto a first wheel rim, a wheel rim stacking apparatus having an annular flange including an inwardly directed substantially cylindrical shaped wall of a diameter substantially commensurate with an outside diameter of a rim flange of said wheel rim to allow said wheel rim to engage said cylindrical wall which is to be located outside of said rim flange, said cylindrical wall including an upper edge and a lower edge, a landing web extending radially inwardly from said annular flange and positioned intermediate of said upper and lower edge of said cylindrical wall, said landing web presenting (a) an upwardly facing surface providing vertical support to an upper one of said wheel rims, and (b) a downwardly facing surface to locate on top of an adjacent lower one of said wheel rims, said annular flange having disposed at a periphery at least one connector to allow connection between aplurality of said annular flanges, to be positioned co adjacent to each other, in order to allow two or more adjacent stacks of supported wheel rims to depend from each other, said connector facilitating mechanical and releasably lockability with adjacent annular flanges,
 (ii) placing onto said upwardly facing surface of said landing web a second wheel rim, said second wheel rim being captured by said annular flange in a manner coaxial with said first wheel rim,
 (iii) repeating steps (i) and (ii) with a subsequent wheel rim to generate a stack of wheel rims, and
 (iv) engaging adjacent ones of the wheel rim stacking apparatus of said stack with like stacking apparatus of an adjacent stack by said connectors.

12. A container which has located therein a plurality of stacks of wheel rims wherein each stack consists of at least two wheel rims wherein interposed between each adjacent wheel rim of each stack there is an apparatus as claimed in claim 1.

13. A wheel rim stacking apparatus to stack at least two wheel rims in a coaxial and vertical relationship, said apparatus comprising:
 an annular flange including an inwardly directed substantially cylindrical shaped wall of a diameter substantially commensurate with an outside diameter of a rim flange of said wheel rim to allow said wheel rim to engage said cylindrical wall, said cylindrical wall being located on the outside of said rim flange, and said cylindrical wall including an upper edge and a lower edge,
 a landing web extending radially inwardly from said annular flange and said landing web being positioned intermediate of said upper and lower edge of said cylindrical wall, said landing web presenting (a) an upwardly facing surface providing vertical support to an upper one of said wheel rims, and (b) a downwardly facing surface to locate on top of an adjacent lower one of said wheel rims,
 said annular flange having disposed at a periphery at least one connector,
 each said connector including a slot extending in an upward/downward direction into which a leg of a bifurcated connector element is located, the other leg of said bifurcated connector element being likewise engagable with an adjacent connector of an adjacent wheel rim stacking apparatus to selectively engage the adjacent wheel rim stacking apparatus.

\* \* \* \* \*